United States Patent [19]

Kanbe et al.

[11] Patent Number: 5,093,737
[45] Date of Patent: * Mar. 3, 1992

[54] METHOD FOR DRIVING A FERROELECTRIC OPTICAL MODULATION DEVICE THEFOR TO APPLY AN ERASING VOLTAGE IN THE FIRST STEP

[75] Inventors: Junichiro Kanbe; Kazuharu Katagiri, both of Yokohama, Japan

[73] Assignee: Canon Kabushiki Kaisha, Tokyo, Japan

[ * ] Notice: The portion of the term of this patent subsequent to Dec. 1, 2004 has been disclaimed.

[21] Appl. No.: 383,457

[22] Filed: Jul. 24, 1989

Related U.S. Application Data

[60] Division of Ser. No. 302,083, Jan. 26, 1989, which is a continuation of Ser. No. 139,130, Dec. 28, 1987, abandoned, which is a continuation of Ser. No. 701,765, Feb. 14, 1985, abandoned.

[30] Foreign Application Priority Data

Feb. 17, 1984 [JP] Japan ................................. 59-28274
Jul. 10, 1984 [JP] Japan ................................. 59-14381

[51] Int. Cl.⁵ ......................... G02F 1/13; G09G 3/36
[52] U.S. Cl. ........................................ 359/56; 340/784
[58] Field of Search .................... 350/333, 332, 350 S, 350/331 R; 340/765, 784, 805

[56] References Cited

U.S. PATENT DOCUMENTS

| | | | |
|---|---|---|---|
| 4,158,860 | 6/1979 | Iue et al. ............................. | 350/333 |
| 4,511,926 | 4/1985 | Crossland et al. ................... | 350/333 |
| 4,638,310 | 1/1987 | Ayliffe .................................. | 350/333 |
| 4,655,550 | 4/1987 | Crossland et al. ................... | 350/333 |
| 4,655,561 | 4/1987 | Kanbe et al. ......................... | 350/333 |
| 4,693,563 | 9/1987 | Harada et al. ....................... | 350/350 S |
| 4,703,305 | 10/1987 | Ayliffe ................................ | 350/333 |
| 4,709,995 | 12/1987 | Kuribayashi et al. ............... | 350/333 |
| 4,712,872 | 12/1987 | Kanbe et al. ......................... | 350/333 |

*Primary Examiner*—Stanley D. Miller
*Assistant Examiner*—Tai V. Duong
*Attorney, Agent, or Firm*—Fitzpatrick, Cella, Harper & Scinto

[57] ABSTRACT

A method for driving an optical modulation device of the type in which a group of scanning electrodes and a group of signal electrodes are so arranged that picture elements are defined at the intersections therebetween and a bistable optical modulation material assuming either one of two stable states depending an electrical field applied is interposed between the two groups of electrodes, comprising: a first phase in which the bistable optical modulation material at the picture elements on an N-th scanning electrode is oriented to one stable state, a second phase in which a writing signal is applied to the signal electrodes in synchronism with a scanning signal to the N-th scanning electrode and a third phase in which the bistable optical modulation material at the picture elements on an N+1-th scanning electrode is oriented to the one stable state. Also disclosed is another driving mode for an optical modulation device having scanning electrodes, signal electrodes and a bistable optical modulation material interposed between the scanning electrodes and the signal electrode, comprising a first step in which a scanning signal is applied to the whole or a part of the scanning electrodes while, in phase therewith, a signal is applied to the whole or a part of the signal electrodes so that the optical modulation material is oriented to a first stable state, and a second step in which a scanning signal is applied to the whole or a part of the scanning electrodes while in phase therewith, a signal is applied to a selected signal electrode among the whole or a part of the signal electrodes so that the bistable optical modulation material is oriented to a second stable state.

8 Claims, 27 Drawing Sheets

F I G. 8 (a)
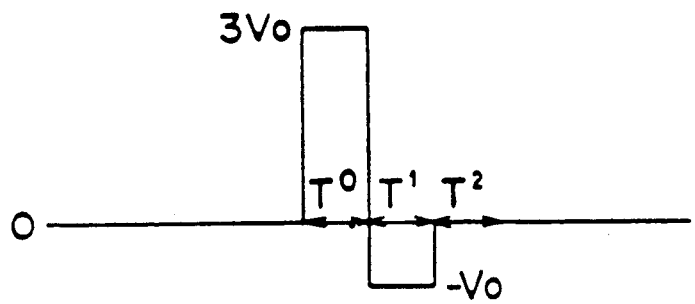
F I G. 8 (b)
F I G. 8 (c)
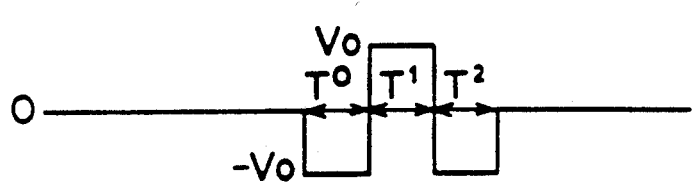

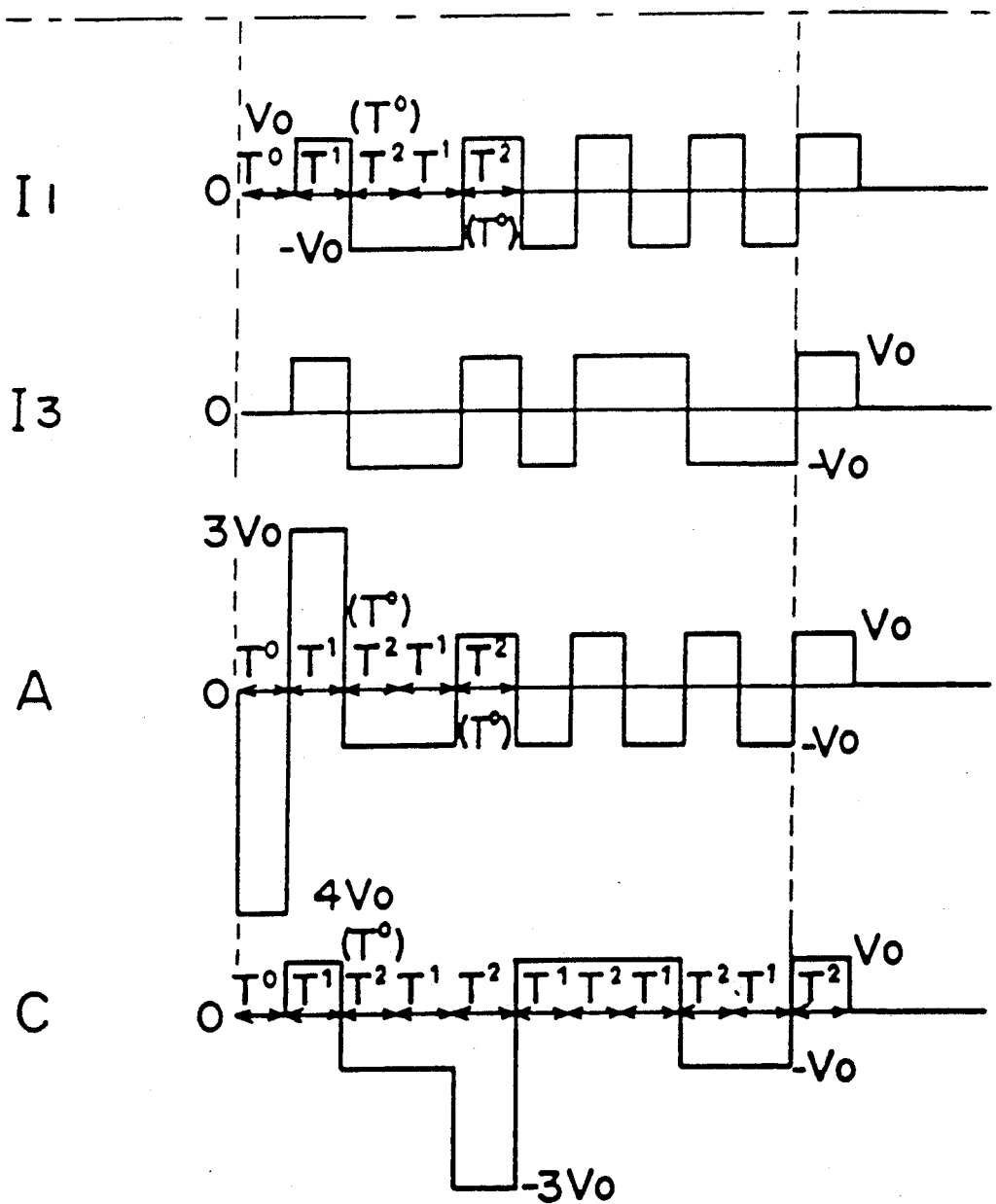
FIG. IIB

METHOD FOR DRIVING A FERROELECTRIC OPTICAL MODULATION DEVICE THEFOR TO APPLY AN ERASING VOLTAGE IN THE FIRST STEP

This application is a division of application Ser. No. 07/302,083 filed Jan. 26, 1989 which is a continuation of Ser. No. 07/139,130 filed on Dec. 28, 1987, abandoned which is a continuation of Ser. No. 06/701,765 filed on Feb. 14, 1985 abandoned.

BACKGROUND OF THE INVENTION

The present invention relates to a method for driving an optical modulation device and more particularly a time-division or time-sharing driving method for driving an optical modulation device such as a display element, an optical shutter array and the like and especially for driving a ferroelectric liquid crystal device.

Liquid crystal display devices for displaying a pattern or information have been well known in which a plurality of scanning electrodes and a plurality of signal electrodes are arranged in the form of a matrix and liquid crystals are interposed between the scanning and signal electrodes, whereby a plurality of picture elements are defined. In order to drive such liquid crystal display devices, a time-division driving method is used in which an address signal is applied sequentially and periodically to the scanning electrodes and, in synchronism with the address signal, predetermined information signals are selectively applied to the signal electrodes in parallel. Such liquid crystal display devices and the methods for driving them have serious defects as will be described below.

A first defect is that it is difficult to increase the density of picture elements or the size of a picture. Liquid crystals which have been used in practice in liquid crystal display devices, because of their fast response and their low electric power consumption, are twisted nematic liquic crystals of the kind disclosed in, for instance, "Voltage Dependent Optical Activity of a Twisted Nematic Liquid Crystals", M. Schadt and W. Helfrich in Applied Physics Letters, Vol. 18, No. 4, (Feb. 15, 1971), pages 127-128. The liquid crystals of this kind assume a helical structure in which the molecules of a nematic liquid crystal having a positive dielectric anisotropy are twisted in the direction of the thickness of the crystal liquid and are arranged in parallel with each other between electrodes when an electric field is not applied. When an electric field is applied, the molecules of the nematic liquid crystal with a positive dielectric anisotropy are oriented in the direction of the electric field, causing optical modulation. In the case of a display device in which a liquid crystal of the kind described is used and which has a matrix of electrodes, a voltage higher than a threshold voltage required for arranging the molecules of the liquid crystal in the direction perpendicular the surfaces of the electrodes is applied to a region (selected point) at which both a scanning electrode and a signal electrode are selected and no voltage is applied to a region (non-selected point) at which neither a scanning electrode nor a signal electrode is selected. As a result, the molecules of the liquid crystal are maintained in a stable state in which they are in parallel with the surfaces of the electrodes. When linear polarizers are disposed upon the upper and lower surfaces of a liquid crystal cell or device of the type described in cross nicol relationship, a selected point prevents the transmission of light while a non-selected point permits the transmission of light, whereby a display or picture is formed. However, in the case of a liquid crystal device with a matrix of electrodes, a finite electric field is applied to a region (the so-called "semi-selected or half-selected point") in which a scanning electrode is selected while a signal electrode is not selected or in which a scanning electrode is not selected while a signal electrode is selected. When the difference between a voltage applied to a selected point and a voltage applied to a half-selected point is sufficiently large, and if a threshold voltage at which the molecules of a liquid crystal are oriented in the direction perpendicular to an electric field applied is between the above described voltages, the correct operation of a display element can be ensured. However, when the number (N) of scanning lines is increased, a time period (duty ratio) during which one selected point is subjected to an effective electric field during the time when one frame is scanned is decreased at a ratio of $1/N$. As a consequence, in the case of repetitive scanning, the greater the number of scanning lines, the smaller the effective voltage difference between a selected point and a non-selected point becomes. As a result, the problems of reduction in contrast of a picture and of crosstalk are unavoidable. These essentially unavoidable problems results when a driving method (that is, a repetitive scanning method) in which a liquid crystal which is not bistable (that is, a liquid crystal in which the molecules assume a stable state in which they are oriented in the horizontal direction relative to the surfaces of the electrodes and are oriented in the vertical direction only when an effective electric field is applied) is driven by utilizing a time storage effect. In order to overcome these problems, there have been proposed a voltage averaging method, a two-frequency driving, a multiple matrix method and so on. However, neither of these is satisfactory in solving the above described problems. Therefore, it is impossible at present to provide a display device with a large picture size and with a high density of picture elements because it is impossible to increase the number of scanning lines.

Meanwhile, a laser beam, printer (LBP) in which the electrical signals representing a pattern are applied in the form of a light pattern to an electrophotographic sensitive member is most excellent as a means for obtaining a hard copy in response to the electrical input signals in the field of printers from the viewpoint of the density of picture elements and the copying speed. However, the laser beam printers have some defects as follows:

1. First, they are large in size as a printer.
2. Second, they have moving parts such as a polygon scanner which are driven at high speeds so that noise is produced and these moving parts must be machined with a higher degree of dimensional accuracy.

In order to overcome the above and other problems, there has been proposed the use of a liquid crystal shutter array which is a means for converting electrical signals into optical signals. However, in the case of generating the picture-element signals with a liquid crystal shutter array, 2000 signal generators are needed in order to write the picture-element signals in a length of 200 mm at a rate of 10 dots per millimeter. Furthermore it is required to apply independent signals to these signal generators through respective lead wires. For these reasons, it has been difficult to provide a liquid crystal shutter array.

In order to overcome the above and other problems another attempt is made to apply one line of image signals in a time sharing manner by signal generators divided into a plurality of times. This method makes it possible to use a common electrode in order to apply a signal to a plurality of signal generators. As a result, the number of conductors can be reduced remarkably. However, when a liquid crystal lacking bistability is used and when the number (N) of lines is increased, the ON time of a signal is substantially reduced to 1/N. As a result, there arise the problems that the quantity of light incident on a photosensitive member is decreased and that crosstalk occurs.

SUMMARY OF THE INVENTION

An object of the present invention is therefore to provide a novel method for driving an optical modulation device, especially a ferroelectric liquid crystal device, which can substantially overcome the above problems encountered in the prior art liquid crystal display devices and liquid crystal optical shutters.

Another object of the present invention is to provide a method for driving an optical modulation device, especially a ferroelectric liquid crystal device, with a fast response.

A further object of the present invention is to provide a method for driving an optical modulation device especially a ferroelectric liquid crystal device, with a high density of picture elements.

The above and other objects of the present invention can be attained by a method for driving an optical modulation device of the type in which a group of scanning electrodes and a group of signal electrodes are so arranged that picture elements are defined at the intersections, respectively, between the scanning and signal electrodes, and bistable optical modulation materials which are made to assume either of two stable states in response to an electric field applied are interposed between the group of scanning electrodes and the group of signal electrodes, having a first phase in which a bistable optical modulation material corresponding to a picture element on an N-th scanning electrode is made to assume a first stable state, a second phase in which a writing signal is applied to the group of signal electrodes in synchronism with a scanning electrode applied to the N-th scanning electrode and a third phase in which a bistable optical modulation material corresponding to a picture element on an N+1-th scanning electrode is made to assume a first stable state or by a method for driving an optical modulation device of the type having a group of scanning electrodes, a group of signal electrodes and bistable optical modulation materials which are made to assume either of two stable states in response to an electric field applied and which are interposed between the group of scanning electrodes and the group of signal electrodes, having a first step in which a scanning signal is applied to the whole or some of the scanning electrodes while, in synchronism with the scanning signal, a signal is applied to the whole or some of the signal electrodes so that the optical modulation materials are made to assume a first stable state and a second step in which a scanning signal is applied to whole or some of the scanning electrodes while, in synchronism with the scanning signal, a signal is applied to the whole or some of the selected signal electrodes so that the bistable optical modulation materials are made to assume a second stable state.

DESCRIPTION OF THE PREFERRED EMBODIMENTS

Figure 1:
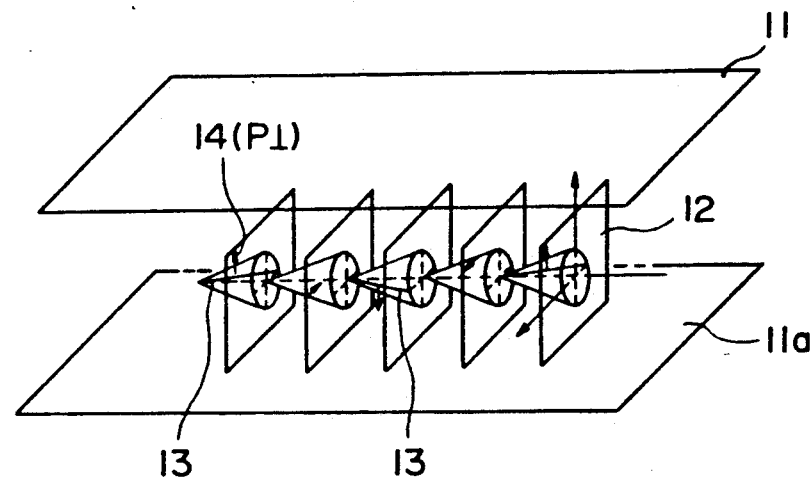
FIGS. 1 and 2 are schematic perspective views illustrating the basic operation principle of a liquid crystal device used in the present invention.

In one preferred embodiment of the present invention, an optical modulation device comprising a group of scanning electrodes which are sequentially and periodically selected in response to a scanning signal, a group of signal electrodes which are disposed in opposed relationship with the scanning electrodes and which are selected in response to a predetermined information signal, and a bistable optical modulation material interposed between the scanning and signal electrodes and adapted to assume either a first optically stable state or a second stable state depending on an electric field applied thereto, can be driven by applying to a selected scanning electrode an electrical signal which has a phase $T^0$ with a voltage for producing an electric field in one direction so that the optical modulation material is oriented to the first stable state regardless of an electrical signal applied to a signal electrode, and a phase T for writing an information signal with a voltage adapted to assist the optical modulation material to be set oriented to the second stable state in response to the electrical signal applied to the signal electrode or more preferably by applying an electric signal of the type described above in which the phase T comprises an information signal phase $T^1$ and an auxiliary signal phase $T^2$ in which an electrical signal with a voltage polarity opposite to that of an electrical signal applied in the phase $T^1$ to the group of signal electrodes in response to a predetermined information.

As an optical modulation material used in a driving method according to the present invention, a material which shows either a first optically stable state or a second optically stable state depending upon an electric field applied thereto, i.e., has bistability with respect to the applied electric field, particularly a liquid crystal having the above-mentioned property, may be used.

Preferable liquid crystals having bistability which can be used in the driving method according to the present invention are chiral smectic C (SmC*)- or H (SmH*)-phase liquid crystals having ferroelectricity. These ferroelectric liquid crystals are described in, e.g., "LE JOURNAL DE PHYSIQUE LETTERS" 36 (L-69), 1975 "Ferroelectric Liquid Crystals"; "Applied Physics Letters" 36 (11) 1980, "Submicro Second Bistable Electrooptic Switching in Liquid Crystals", "Solid State Physics" 16 (141), 1981 "Liquid Crystal", etc. Ferroelectric liquid crystals disclosed in these publications may be used in the present invention.

More particularly, examples of ferroelectric liquid crystal compound usable in the method according to the present invention include decyloxybenzylidene-p'-amino-2-methylbutyl cinnamate (DOBAMBC), hexyloxybenzylidene-p'-amino-2-chloropropyl cinnamate (HOBACPC), 4-o-(2-methyl)-butylresorcilidene-4'-octylaniline (MBRA8), etc.

In addition to the SmC*- or SmH*-phase liquid crystals as described above, liquid crystals showing chiral smectic I phase (SmI*), J phase (SmJ*), G phase (SmG*), F phase (SmF*) or K phase (SmK*) may also be used in the present invention.

When a device is constituted using these materials, the device may be supported with a block of copper, etc., in which a heater is embedded in order to realize a temperature condition where the liquid crystal compounds assume a smectic phase.

Figure 2:
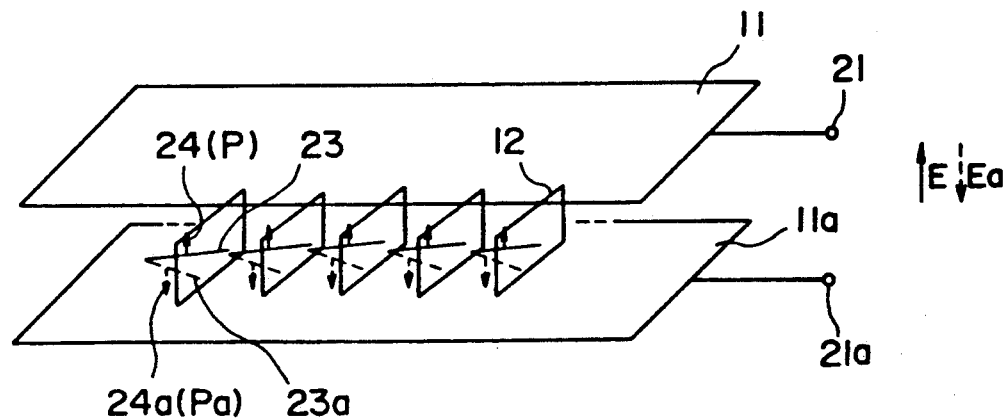

Referring to FIG. 1, there is schematically shown an example of a ferroelectric liquid crystal cell for explanation of the operation thereof. Reference numerals 11 and 11a denote base plates (glass plates) on which a transparent electrode of, e.g., $In_2O_3$, $SnO_2$, ITO (Indium-Tin Oxide), etc., is disposed, respectively. A liquid crystal of an SmC*- or SmH*-phase in which liquid crystal molecular layers 12 are oriented perpendicular to surfaces of the glass plates is hermetically disposed therebetween. A full line 13 shows liquid crystal molecules. Each liquid crystal molecule 13 has a dipole moment (P⊥) 14 in a direction perpendicular to the axis thereof. When a voltage higher than a certain threshold level is applied between electrodes formed on the base plates 11 and 11a, and helical structure of the liquid crystal molecule 13 is loosened a unwound to change the alignment direction of respective liquid crystal molecules 13 so that the dipole moments (P⊥) 14 are all directed in the direction of the electric field. The liquid crystal molecules 13 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device, of which optical characteristics vary depending upon the polarity of an applied voltage. Further, when the thickness of the liquid crystal cell is sufficiently thin (e.g., 1 $\mu$) the helical structure of the liquid crystal molecules is loosened even in the absence of an electric field whereby the dipole moment assumes either of the two states, i.e., P in an upper direction 24 or Pa in a lower direction 24a as shown in FIG. 2. When electric field E or Ea higher than a certain threshold level and different from each other in polarity as shown in FIG. 2 is applied to a cell having the above-mentioned characteristics, the dipole moment is directed either in the upper direction 24 or in the lower direction 24a depending on the vector of the electric field E or Ea. In correspondence with this, the liquid crystal molecules are oriented in either of a first stable state 23 and a second stable state 23a.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 2. When the electric field E is applied to the liquid crystal molecules, they are oriented in the first stable 23. This state is kept stable even if the electric field is removed. On the other hand, when the electric field Ea of which direction is opposite to that of the electric field E is applied thereto, the liquid crystal molecules are oriented to the second stable state 23a, whereby the directions of molecules are changed. This state is also kept stable even if the electric field is removed. Further, as long as the magnitude of the electric field E being applied is not above a certain threshold value, the liquid crystal molecules are placed in the respective orientation states. In order to effectively realize high response speed and bistability, it is preferable that the thickness of the cell is as thin as possible and generally 0.5 to 20 $\mu$, particularly 1 to 5 $\mu$. A liquid crystal-electrooptical device having a matrix electrode structure in which the ferroelectric liquid crystal of this kind is used is proposed, e.g., in the specification of U.S. Pat. No. 4,367,924 by Clark and Lagerwall.

A preferred embodiment of the driving method according to the present invention is explained with reference to FIG. 3.

Figure 3:
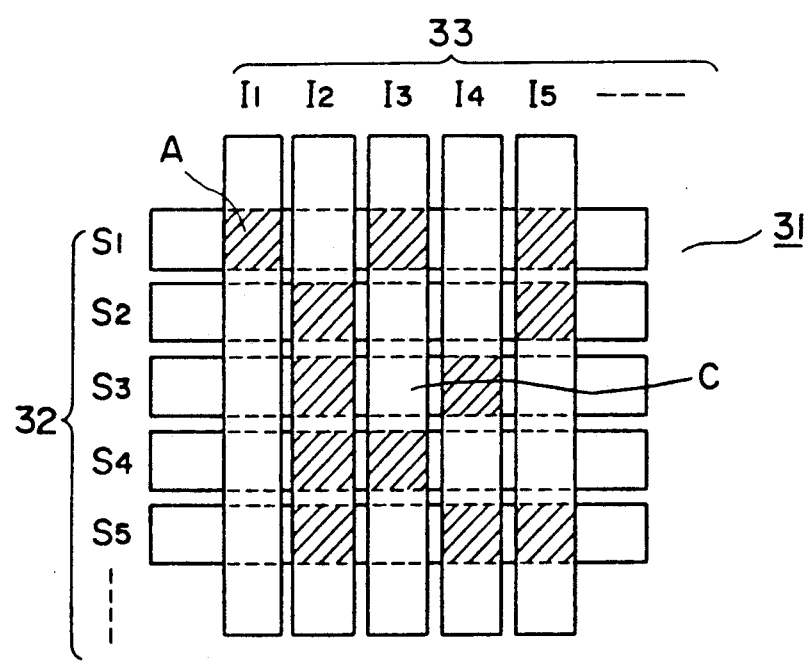
FIG. 3 is a schematic plan view of a matrix of electrodes used in the driving method in accordance with the present invention.
Figure 4:
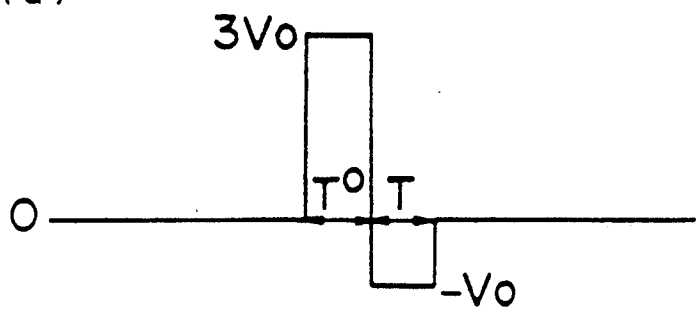
FIGS. 4(a)-(f) are views showing waveforms of electrical signals applied to the electrodes.
Figure 4:
Figure 4:
Figure 4D:
Figure 4E:
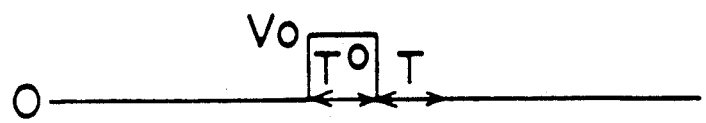
Figure 4F:
Figure 5:
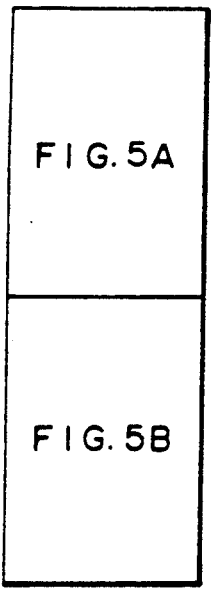
FIG. 5 (combination of FIGS. 5A and 5B) shows the waveforms of voltages applied in time series.
Figure 5A:
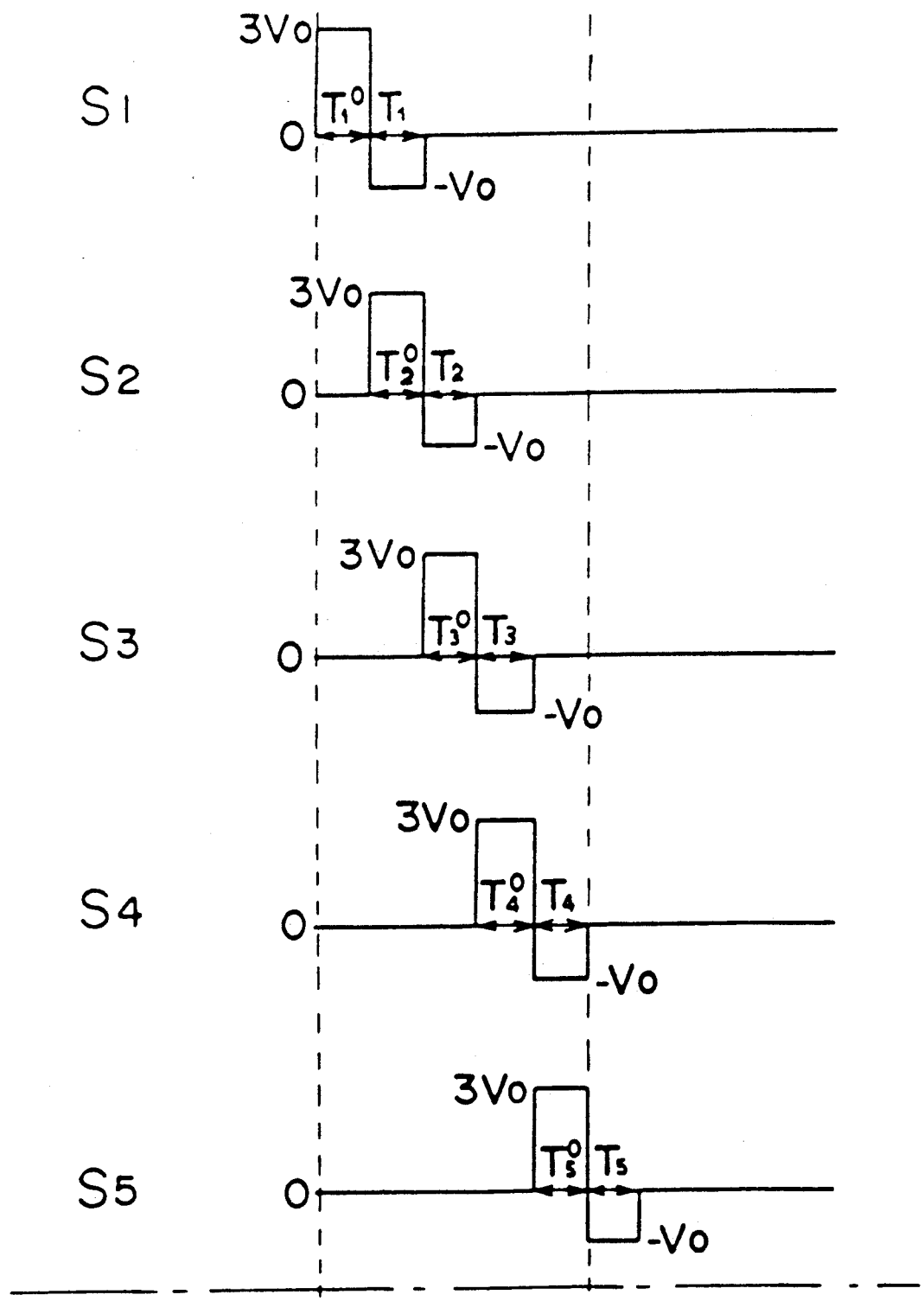
Figure 5B:
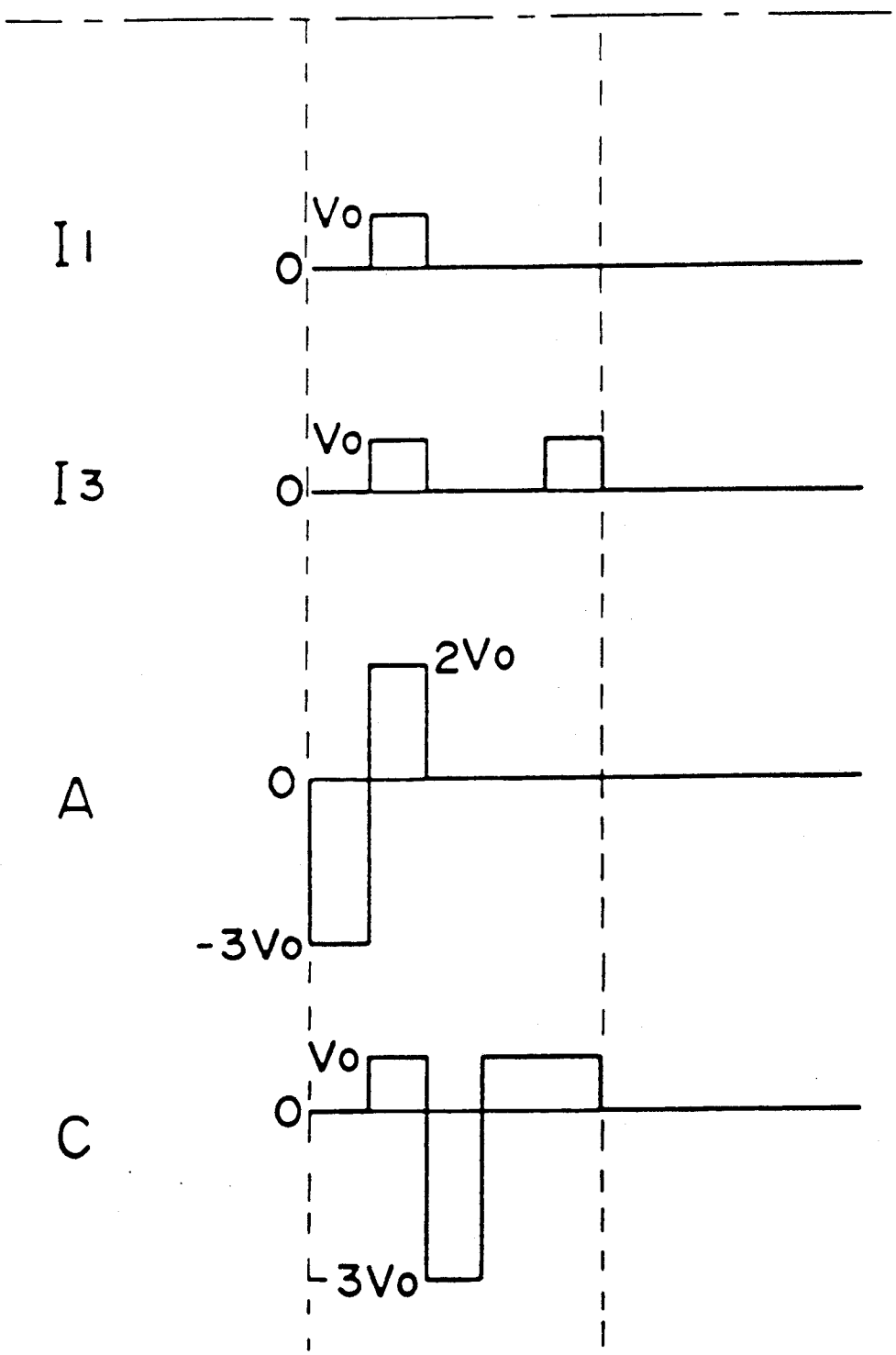
Figure 6A:
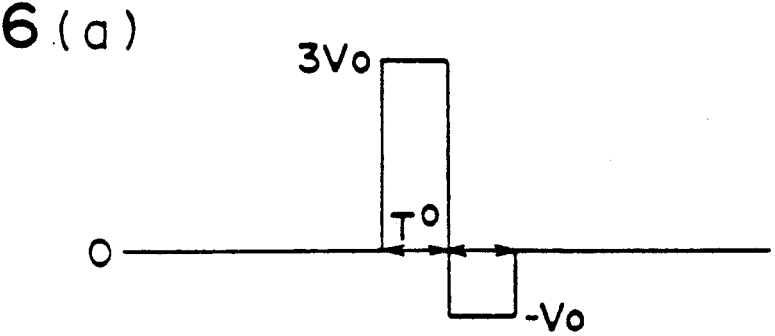
FIGS. 6(a)-(f) show the waveforms of electrical signals applied to the electrodes in an another embodiment of the present invention.
Figure 6B:
Figure 6C:
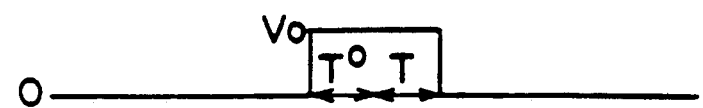
Figure 6D:
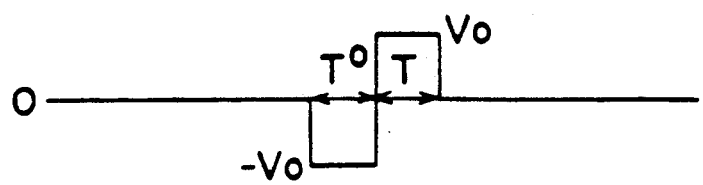
Figure 6E:
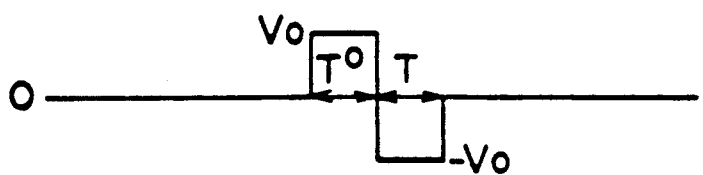
Figure 6F:
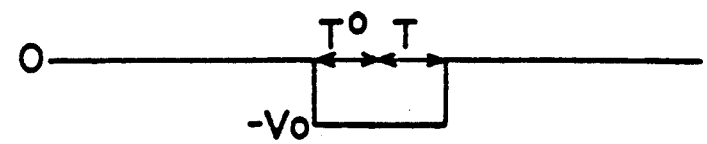

FIG. 3 is a schematic view of a cell 31 with a matrix of electrodes comprising scanning electrodes 32 and signal electrodes 33, and a ferroelectric liquid crystal interposed therebetween. For the sake of better understanding of the present invention, a simple case in which a picture element becomes black or white in response to a binary signal will be described. In FIG. 3, the hatched picture elements represent "black" while the white picture elements, "white". FIG. 4(a) shows an electric signal applied to a selected scanning electrode; FIG. 4(b) shows an electrical signal applied to the other scanning electrodes (non-selected scanning electrode); and FIGS. 4(c) and (d) respectively show electrical signals which are applied to a selected signal electrode (which represents "black"). More particularly, FIG. 4(c) shows an electrical signal applied to a selected signal electrode when the preceding electrical signal has represented "black", while FIG. 4(d) shows an electrical signal applied to a selected signal electrode when the preceding electrical signal has represented "white". FIGS. 4(e) and (f) show electrical signals which are applied to the signal electrodes which are not selected (and which represent "white"). More particularly, FIG. 4(e) shows an electrical signal applied to the nonselected signal electrodes when the preceding electrical signal has represented "black" while FIG. 4(f) shows an electrical signal applied to the non-selected signal electrodes when the preceding electrical signal has represented "white". In a phase $T^0$, all the picture elements on one scanning electrode once become "white"; and in a phase T, an information signal is written. In this embodiment, $T^0 = T = \Delta t$. FIG. 5 (combination of FIGS. 5A and 5B) shows the driving waveforms when the pattern as shown in FIG. 3 is displayed in response to the electrical signals as shown in FIG. 4. In FIG. 5, $S_1$–$S_5$ represent the signals applied to the scanning electrodes; $I_1$ and $I_3$, the signals applied to the signal electrodes $I_1$ and $I_3$, respectively; and A and C, the waveforms of voltages applied to the picture elements A and C, respectively, shown in FIG. 3. A threshold voltage when it is applied for a time period of $\Delta t$ in order to drive a bistable liquid crystal into a first stable state (in which a picture element becomes "white") is represented by $-Vth_2$, while a threshold voltage when it is applied for a time period of $\Delta t$ in order to drive the bistable liquid crystal into a second stable state (in which a picture element becomes "black") is represented by $Vth_1$. Then, the value of $V_0$ is so selected that the following relations may be satisfied:

$V_0 < Vth_1 < 2V_0$, and $-2V_0 < -Vth_2 - V_0$.

As is clear from FIG. 5, all the picture elements on one scanning electrode are caused to become "white" once and thereafter "black" or "white" is selected in response to information. In the case of a picture element which represents "black", the reversal from "white" to "black" occurs, whereby the information is written. When the writing of information into the picture elements on one scanning electrode is being carried out within a predetermined phase (time period), the operation for causing all the picture elements on the next scanning electrode to become "white" is simultaneously carried out. Therefore, the operation for writing information into all the picture elements in one frame by scanning can be accomplished at a very high speed.

Figure 7:
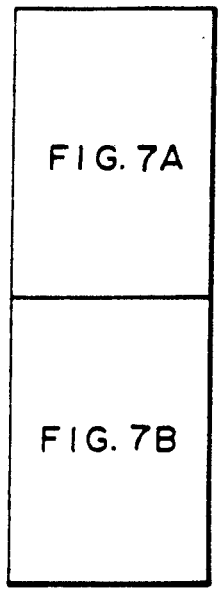
FIG. 7 (combination of FIGS. 7A and 7B) shows the waveforms of voltages applied in time series in said another embodiment of the present invention.

Another embodiment of the driving method in accordance with the present invention is shown in FIGS. 6 and 7. FIG. 6(a) shows an electric signal applied to a selected scanning electrode; and FIG. 6(b) shows an electric signal applied to the scanning electrodes which are not selected. FIGS. 6(c)–(f) show electrical signals applied to the signal electrodes. FIGS. 6(c) and (e) show the information signals applied when the preceding signal has represented "black", while FIGS. 6(d) and (f) show the information signals applied when the preceding signal has represented "white". In FIGS. 6(c) and (d), an information signal $V_0$ for representing "black" is shown as being applied in a phase T, while an information signal $-V_0$ for representing "white" is shown as being applied in the phase T in FIGS. 6(e) and (f).

Figure 7A:
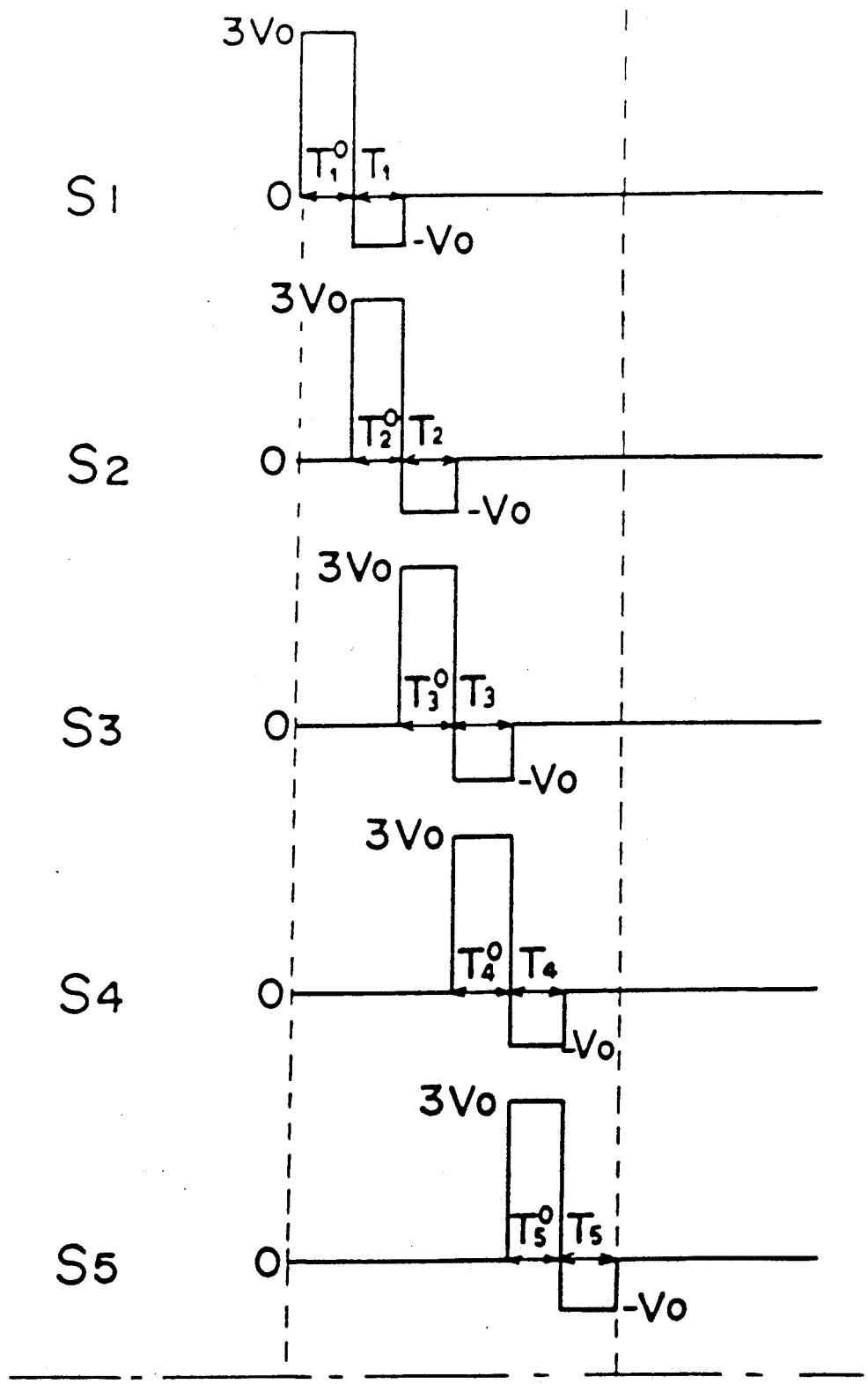
Figure 7B:
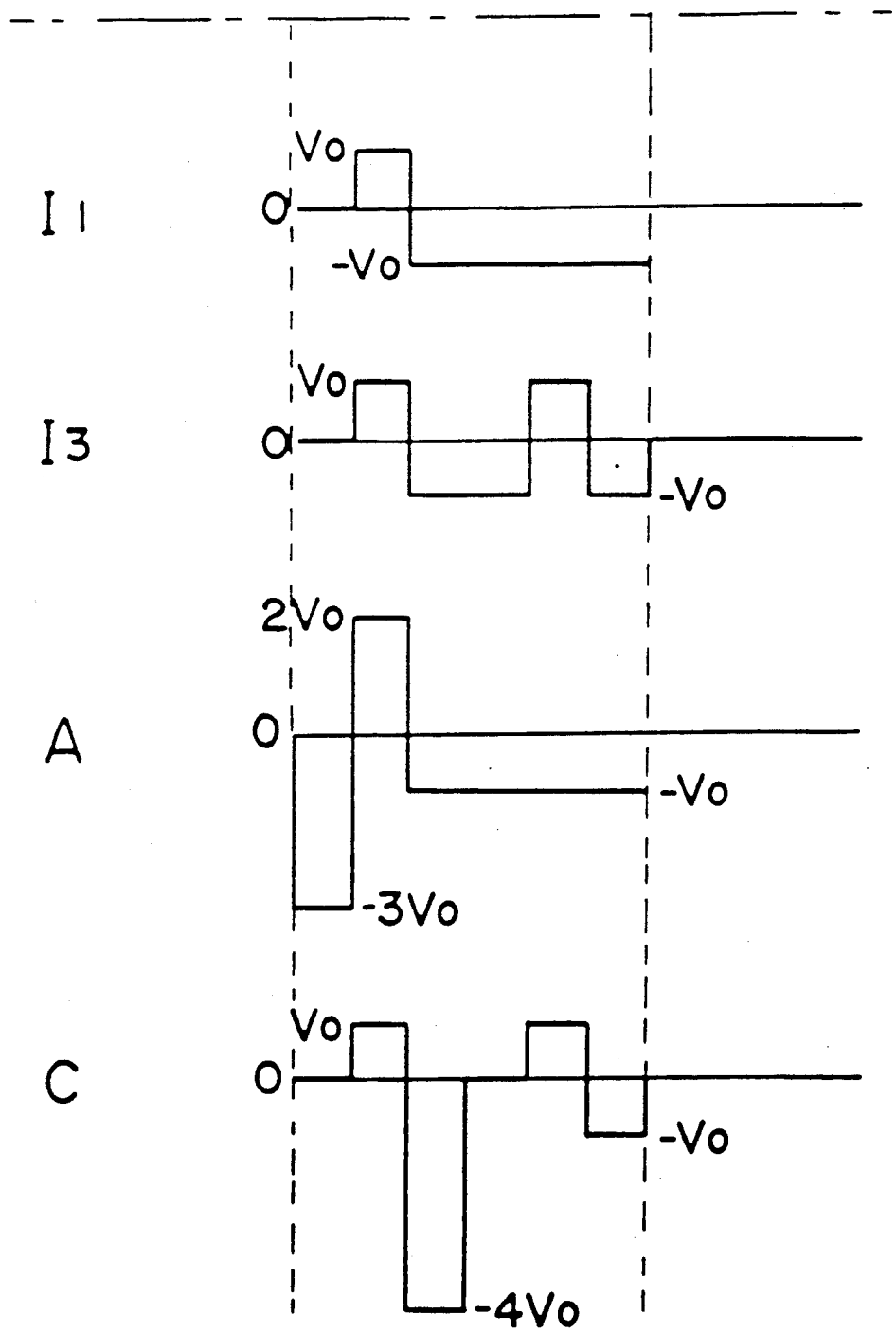

FIG. 7 (combination of FIGS. 7A and 7B) shows the driving waveforms when the pattern as shown in FIG. 3 is displayed. In FIG. 7, $S_1$–$S_5$ represent the signals applied to the scanning electrodes; $I_1$ and $I_3$ represent the signals applied to the signal electrodes $I_1$ and $I_3$, respectively; and A and C represent the waveforms of the voltages applied to the picture elements A and C, respectively, of the pattern shown in FIG. 3.

Microscopic mechanism of switching due to electric field of a ferroelectric liquid crystal having bistability has not been fully clarified. Generally speaking, however, the ferroelectric liquid crystal can retain its stable state semi-permanently, if it has been switched or oriented to the stable state by application of a strong electric field for a predetermined time and is left standing under absolutely no electric field. However, when a reverse polarity of an electric field is applied to the liquid crystal for a long period of time, even if the electric field is such a weak field (corresponding to a voltage below $V_{th}$ in the previous example) that the stable state of the liquid crystal is not switched in a predetermined time for writing, the liquid crystal can change its stable state to the other one, whereby correct display or modulation of information cannot be accomplished. We have recognized that the liability of such switching or reversal of oriented states under a long term application of a weak electric field is affected by the material and roughness of a base plate contacting the liquid crystal and the kind of the liquid crystal, but have not clarified the effects quantitatively. We have confirmed a tendency that a monoaxial treatment of the base plate such as rubbing or oblique or tilt vapor deposition of SiO, etc., increases the liability of the above-mentioned reversal of oriented states. The tendency is manifested at a higher temperature compared to a lower temperature.

Anyway, in order to accomplish correct display or modulation of information, it is advisable that one direction of electric field is prevented from being applied to the liquid crystal for a long time.

In a preferred embodiment of the driving method in accordance with the present invention, therefore, there is provided an auxiliary signal phase $T^2$ in order to prevent the continuous application of an electric field in one direction as will be described in detail with reference to FIGS. 8 and 9 hereinafter.

Figure 8:
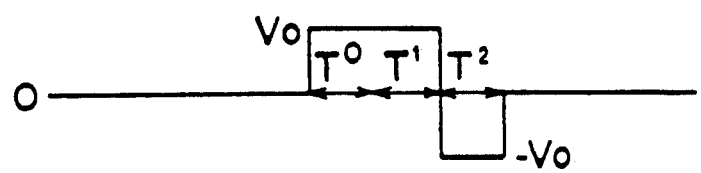
FIGS. 8(a)-(f) show the waveforms of electrical signals applied to the electrodes in a further embodiment of the present invention.
Figure 8:
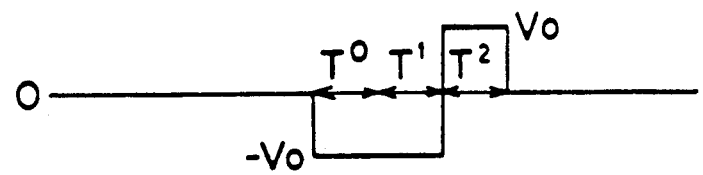
Figure 8:
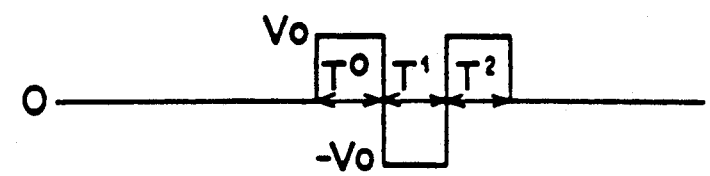

FIG. 8(a) shows an electrical signal applied to a selected scanning electrode; and FIG. 8(b), an electrical signal applied to the scanning electrodes which are not selected. As shown in FIGS. 8(c)–(f), during a phase $T^2$, signals with a polarity opposite to that of the information signal applied in the phase $T^1$ (corresponding to "black" in FIGS. 8(c) and (d), and "white" in FIGS. 8(e) and (f)) is applied to a signal electrode. This will be described in more detail in conjunction with the display of the pattern as shown in FIG. 3. In the case of the driving method without the phase $T^2$, the picture element A becomes "black" in response to the scanning of the scanning electrode $S_1$, but there arises a problem that the picture element A erratically becomes "white" because when the scanning electrodes $S_2$, $S_3$ and so on are successively scanned, the electrical signal of $-V_0$ is continuously applied to the signal electrode $I_1$ and hence to the picture element A. However, if an auxiliary signal phase $T^2$ is provided as described above, there arises no problem of crosstalk as is clear from the time serial signals shown in FIG. 8.

FIGS. 8(c) and (e) show the electrical signals applied when the preceding signal has represented "black", while FIGS. 8(d) and (f) show the electrical signals applied when the preceding signal has represented "white".

Figure 9:
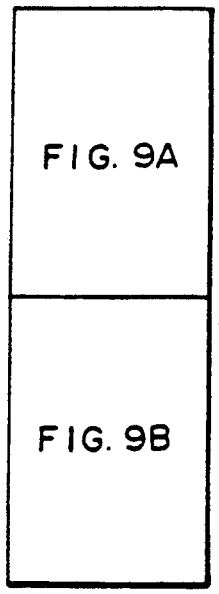
FIG. 9 (combination of FIGS. 9A and 9B) shows the waveforms of voltages applied in time series in said further embodiment of the present invention.
Figure 9A:
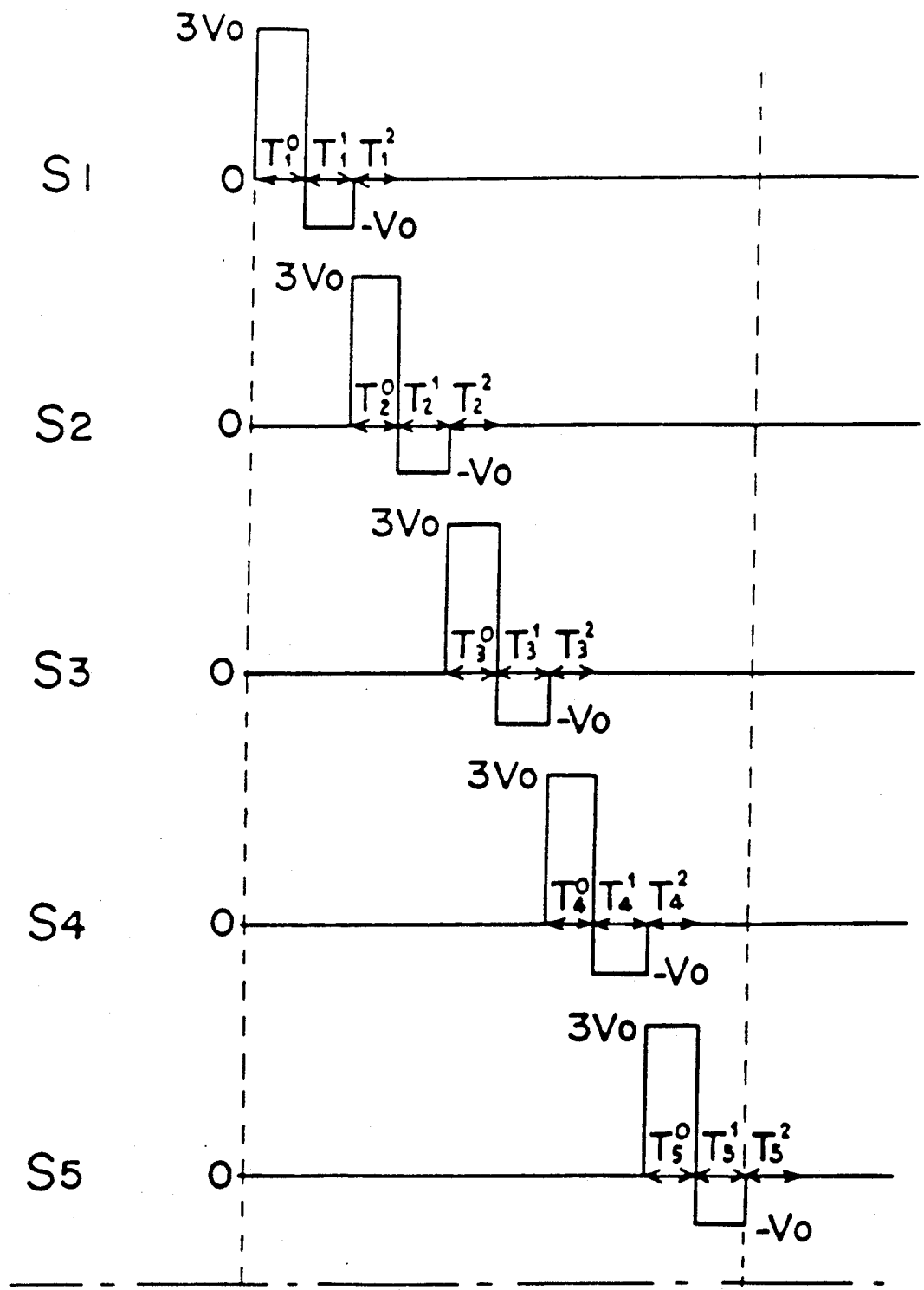
Figure 9B:
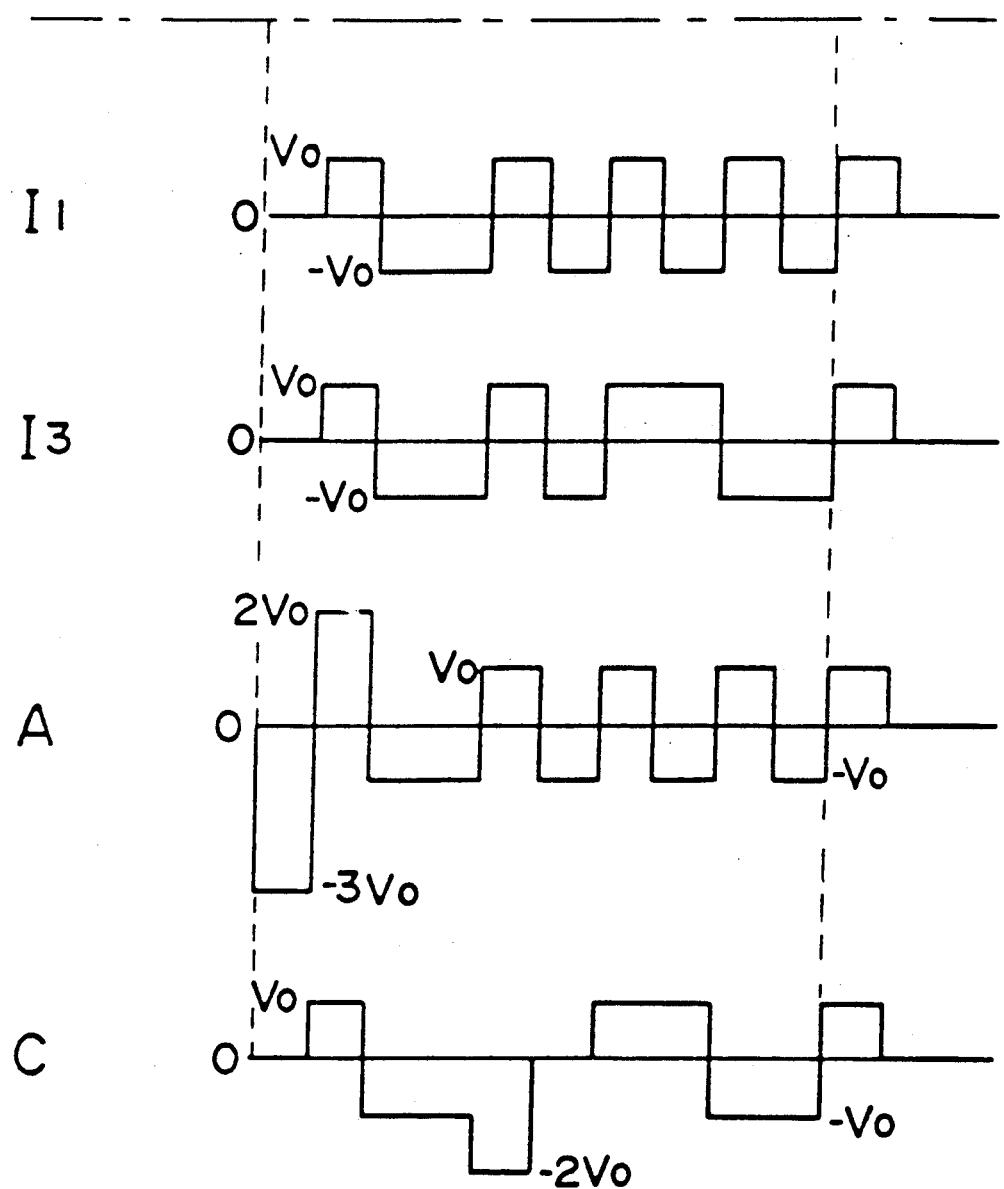

FIG. 9 (combination of FIGS. 9A and 9B) shows the driving waveforms used to display the pattern as shown in FIG. 3. In FIG. 9, $S_1$–$S_5$ represent the signals applied to the scanning electrodes; $I_1$ and $I_3$ represent the signals applied to the signal electrodes $I_1$ and $I_3$, respectively; and A and C represent the waveforms of the voltages applied to the picture elements A and C, respectively, as shown in FIG. 3.

A further embodiment of the driving method in accordance with the present invention will be described with reference to FIGS. 10 and 11. In this embodiment, $V_0$, $Vth_1$ and $Vth_2$ are so selected that the following relations may be satisfied:

$$V_0 < Vth_2 < 3V_0, \text{ and } -3V_0 < -Vth_2 < -V_0.$$

Figure 10A:
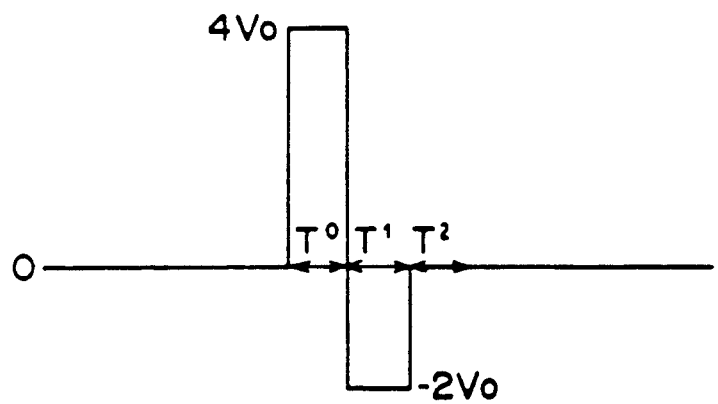
FIGS. 10(a)-(f) show the waveforms of electrical signals applied to the electrodes in yet a further embodiment of the present invention.
Figure 10B:
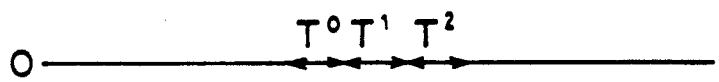

FIG. 10(a) shows the electrical signal applied to a selected scanning electrode; and FIG. 10(b), the electrical signal applied to the scanning electrodes which are not selected.

Meanwhile, an optimum time interval of the auxiliary signal phase $T^2$ is dependent upon the magnitude of a voltage applied to a signal electrode. When a voltage with a polarity opposite to that of a voltage applied during the information signal phase $T^1$ is applied, it is preferred in general that when a higher voltage is applied, the time period of the phase $T^2$ is shorter while when a lower voltage is applied, the time period is longer. However, when the time period is long, it takes a long time to scan the whole picture. As a result, it is preferable to set $T^2 \leq T^1$.

Figure 10C:
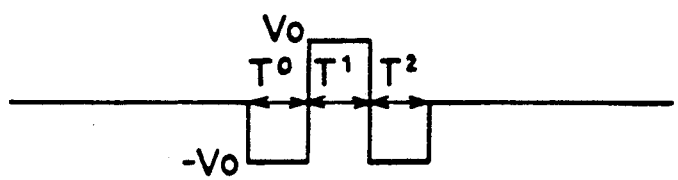
Figure 10D:
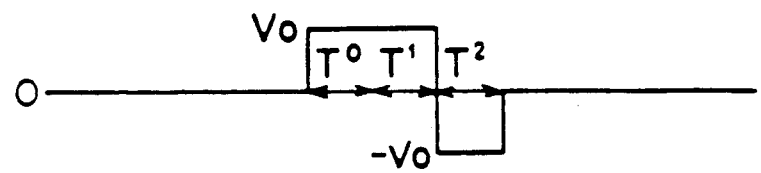
Figure 10E:
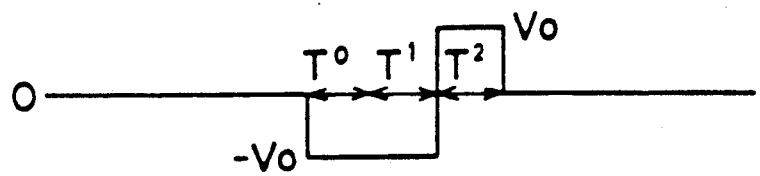
Figure 10F:
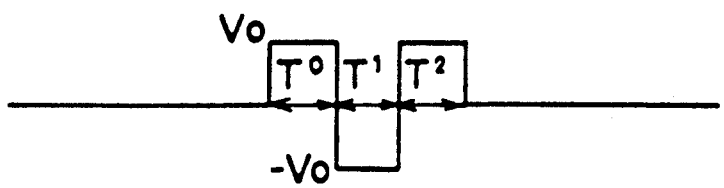
Figure 11A:
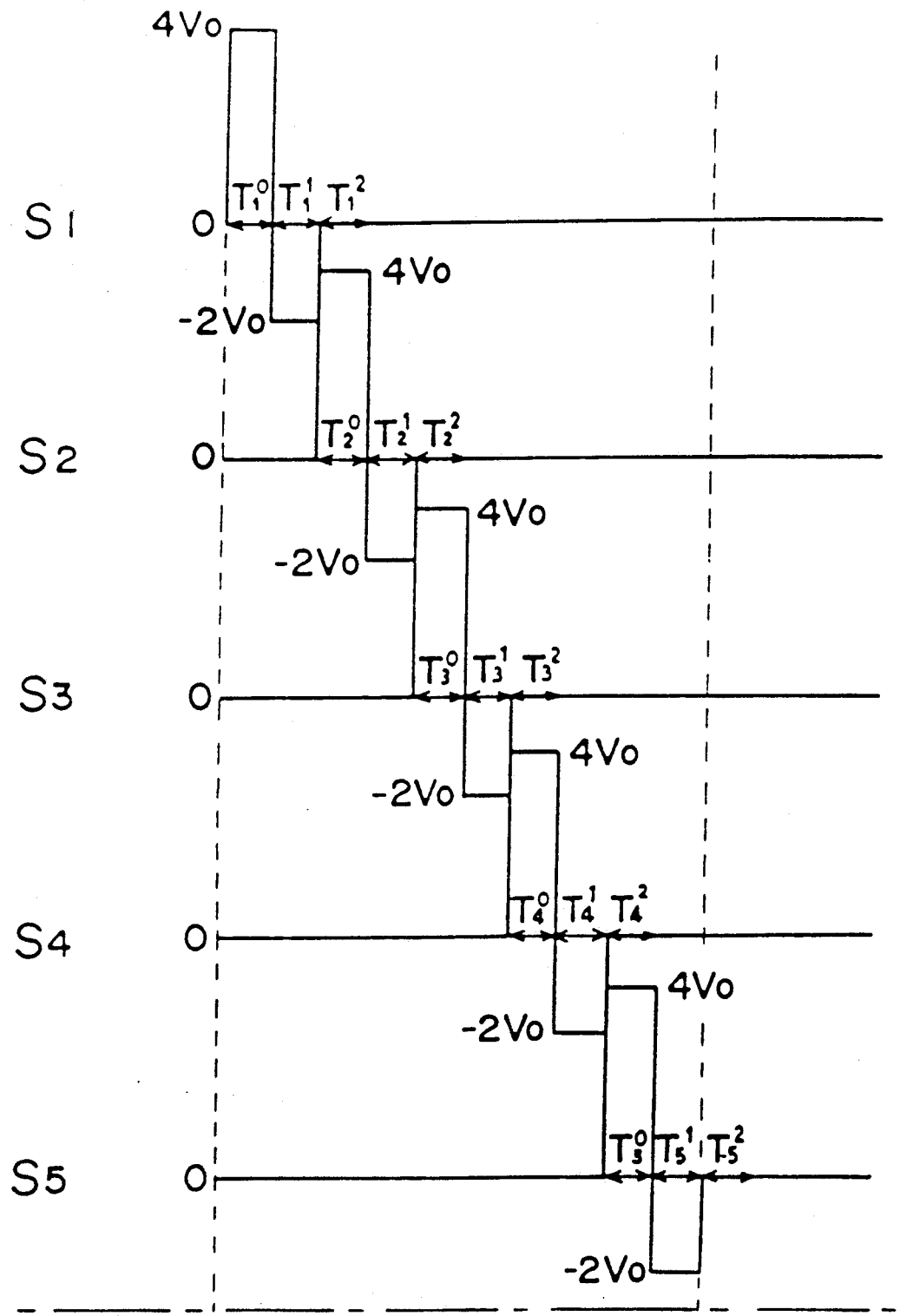

FIGS. 10(c)-(f) show the information signals applied to the signal electrodes. FIGS. 10(c) and (e) show the information signals applied when the preceding signal has represented "black", while FIGS. 10(d) and (f) show the information signals applied when the preceding signal has represented "white". In FIGS. 10(c) and (d), an information signal $V_0$ for representing "black" is applied during the phase $T^1$, and an information signal $V_0$ for representing "white" is applied during the phase $T^1$.

Figure 11:
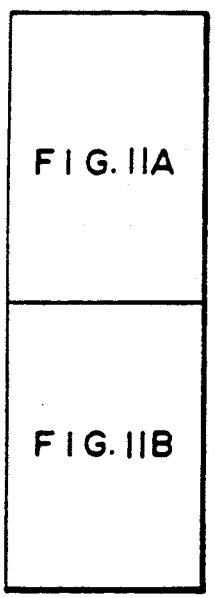
FIG. 11 (combination of FIGS. 11A and 11B) shows the waveforms of voltages applied in time series in a further embodiment of the present invention.

FIG. 11 shows the driving waveforms used when the pattern as shown in FIG. 3 is displayed. In FIG. 11, $S_1$-$S_5$ represent the signals applied to the scanning electrodes; $I_1$ and $I_3$, the signals applied to the electrodes $I_1$ and $I_3$, respectively; and A and C, the waveforms of the voltages applied to the picture elements A and C, respectively, as shown in FIG. 3.

The present invention will now be explained with reference to working examples.

EXAMPLE 1

A pair of glass plates whose transparent conductor films (ITO) were so patterned as to define a 500×5000 matrix were coated with a polyimide film of about 300A in thickness by a spin coating process. Thereafter the glass plates were subjected to a rubbing process with a roller about which a suede cloth was wound and then were joined together in such a way that the rubbing directions were aligned, whereby a cell was provided. The cell gap was about 1.2 μ. DOBAMBC, which is a ferroelectric liquid crystal, was filled into the cell and was gradually cooled from the heated and molten state, whereby a uniform monodomain in the SmC state was obtained. The cell temperature was maintained at 70° C. and $V_0$ was set to 10 V while the phases $T^0 = T^1 = T^2 = \Delta t$ were set to 50 microseconds in accordance with the driving method described above with reference to FIG. 10. Extremely high-quality pictures could be obtained by the line-by-line scanning.

Figure 12:
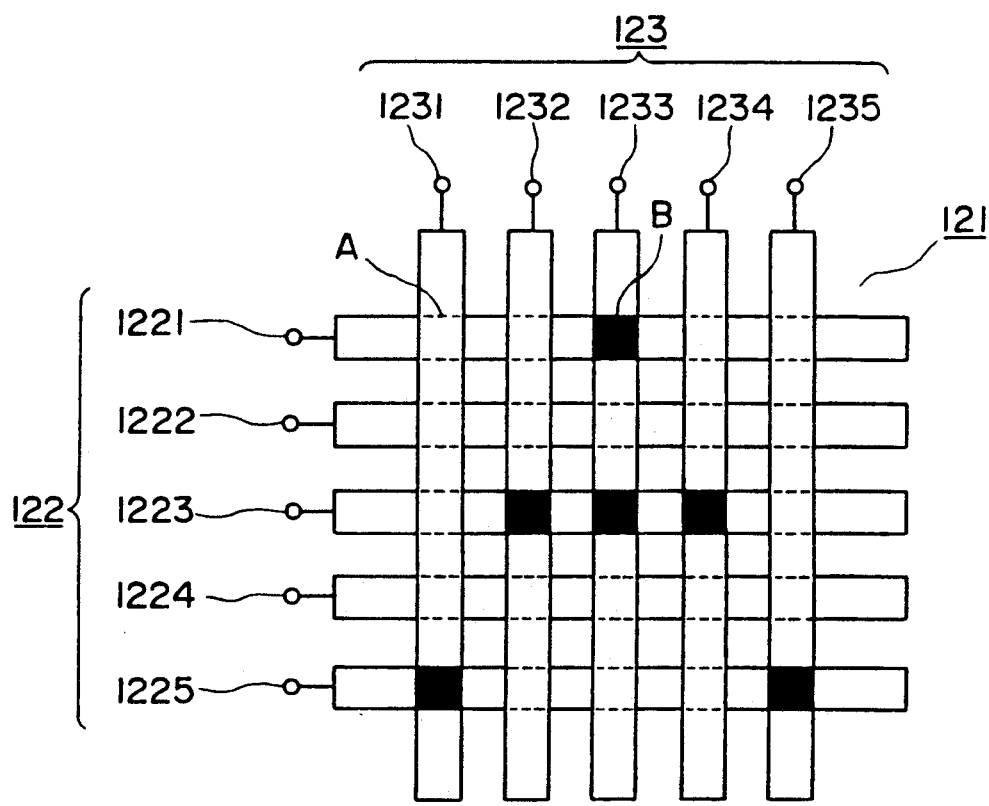
FIG. 12 is a schematic plan view of a matrix of electrodes of a liquid crystal device driven by the method of the present invention.

Yet another embodiment of the driving method in accordance with the present invention will be described with reference to FIG. 12 showing schematically a cell 121 with a matrix of electrodes and a ferroelectric liquid crystal (not shown) sandwiched between the electrodes. The cell 121 has a group of scanning electrodes 122 and a group of signal electrodes 123.

Figure 13A:
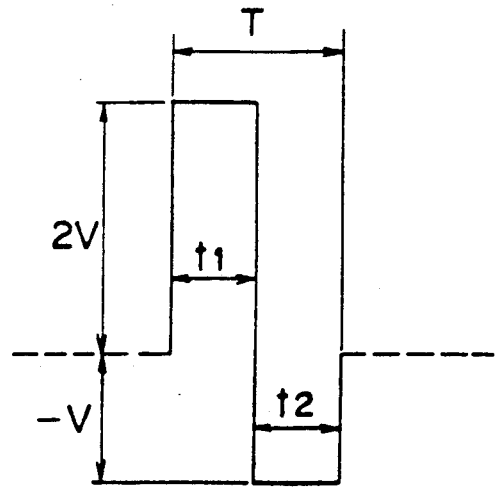
FIGS. 13(a)-(d) show the waveforms of electrical signals.
Figure 13B:
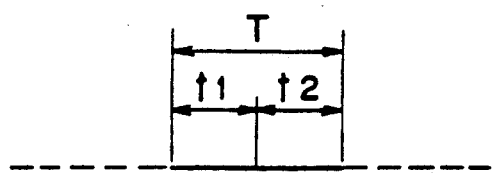
Figure 13C:
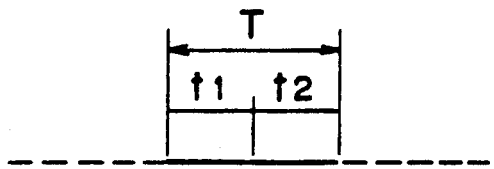
Figure 13D:
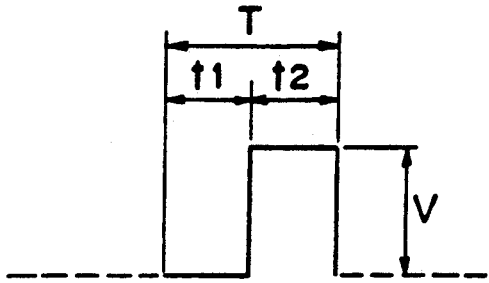

FIG. 13(a) shows the scanning signal applied to a selected scanning electrode, and FIG. 13(b) the scanning signal applied to the scanning electrodes which are not selected. FIG. 13(c) shows an electrical signal (referred to as a "white" signal) which drives a ferroelectric liquid crystal into a first stable state and FIG. 13(d) shows an electrical signal (referred to as a "black" signal) which drives the liquid crystal into a second stable state.

Figure 14:
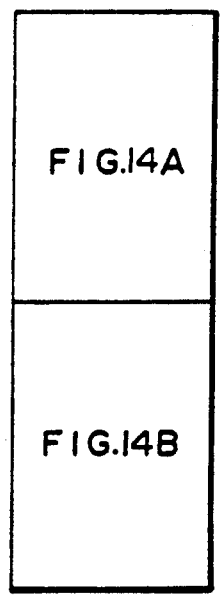
FIG. 14 (combination of FIGS. 14A and 14B) shows the waveforms of voltages applied in time series.
Figure 14A:
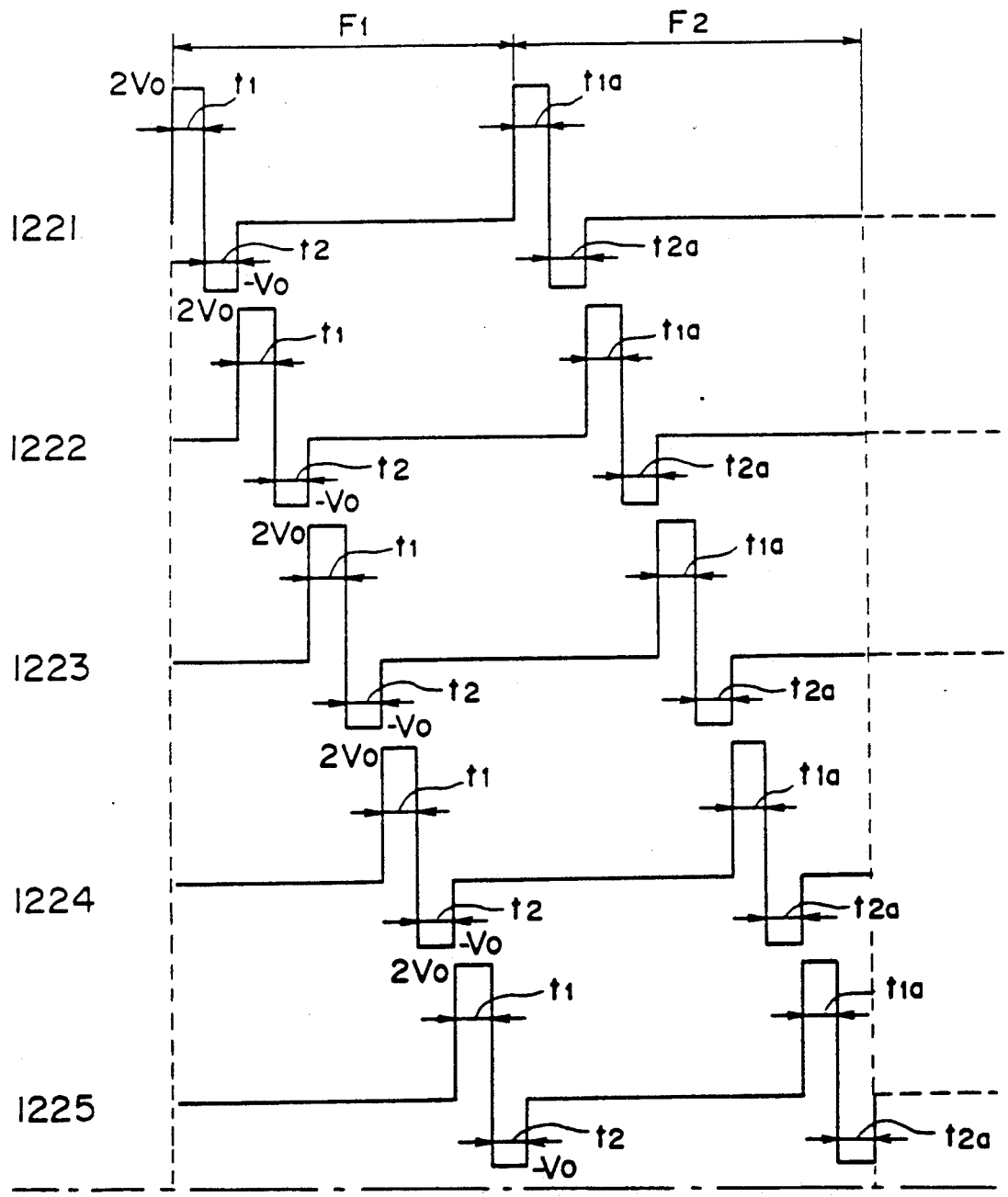
Figure 14B:
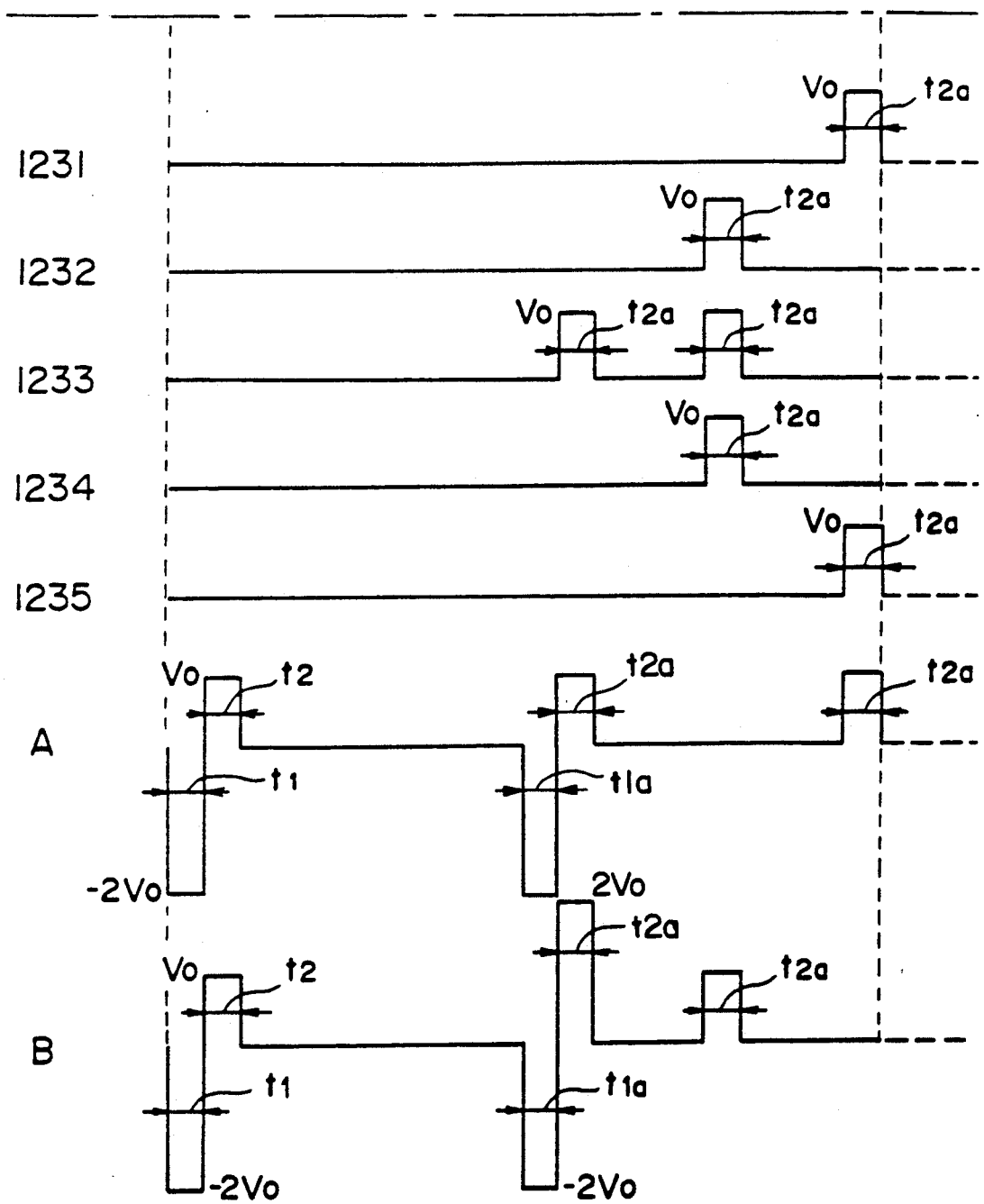

First, as shown in FIG. 14 (combination of FIGS. 14A and 14B) in a first frame $F_1$, the scanning signal is applied to the whole or a part of the scanning electrodes 122 and, in synchronism with the scanning signal, the "white" signal is applied to the whole or a part of the signal electrodes 123. In a second frame $F_2$, the "black" signal is applied to the predetermined portions as shown in FIG. 12 (black picture elements). FIG. 14 shows the waveforms of the voltages applied to the picture elements A and B, respectively, as shown in FIG. 12 and the electrical signals applied to the scanning electrodes 1221, 1222, 1223, 1224 and 1225 and to the signal electrodes 1231, 1232, 1233, 1234 and 1235.

$V_0$ is so selected that the following relations may be satisfied:

$$V_0 < Vth_1 < 2V_0, \text{ and } -V_0 > -Vth_2 > 2V_0.$$

Therefore, as is clear from FIG. 14, $-2V_0$ is applied during the phase $t_1$ to the whole picture elements on the scanning electrode to which the scanning signal is applied (or to the picture elements to be rewritten in the case of rewriting) so that the ferroelectric liquid crystal is driven into the first stable state. During the phase $t_2$, the voltage applied to the picture elements is $V_0$, but $V_0 < Vth_1$ so that the first state ("white") into which the liquid crystal has been driven during the phase $t_1$ can be maintained. As described above, during the first frame all the picture elements are once erased to "white" in response to the "white" signal. Thereafter during the second frame $F_2$ the "black" signal which is in synchronism with the scanning signal is applied to the signal electrodes so that only the predetermined picture elements become "black". Thus one black-and-white picture is displayed. In this case, $2V_0$ is applied during the phase $t_{2a}$ to the picture element to which the "black" signal is applied after $-2V_0$ has been applied during the phase $t_{1a}$. As a result, the ferroelectric liquid crystal which stays in the first stable state during the phase $t_{1a}$ is caused to be driven into the second stable state during the phase $t_{2a}$ and consequently becomes "black".

The voltage V and the phase T ($=t_1 + t_2$) are dependent upon a liquid crystal used and the thickness of a cell, but in general the voltage is 3–70 V while the phase is in a range between 0.1 microsecond and 2 milliseconds.

It would be apparent to those skilled in the art that in order to effectively carry out the driving method in accordance with the present invention, the electrical signals applied to the scanning and signal electrodes are not limited to simple signals having rectangular waveforms as shown in FIG. 14 and that the driving method of the present invention can be carried out with signals having sinusoidal or triangular waveforms.

Figure 15:
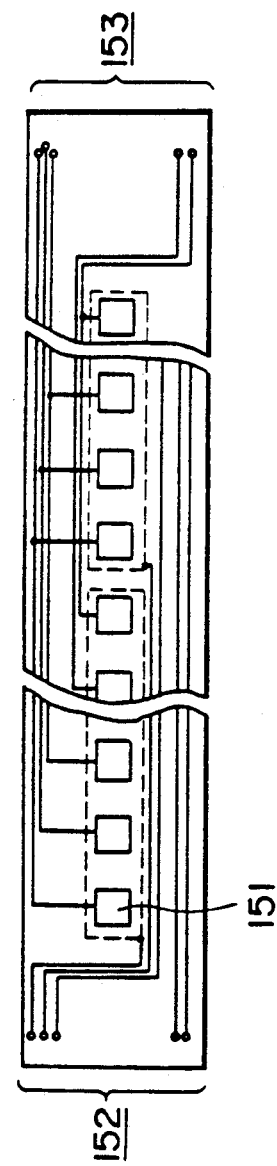
FIG. 15 is a schematic plan view of a liquid crystal optical shutter which is driven by the method of the present invention.
Figure 16A:
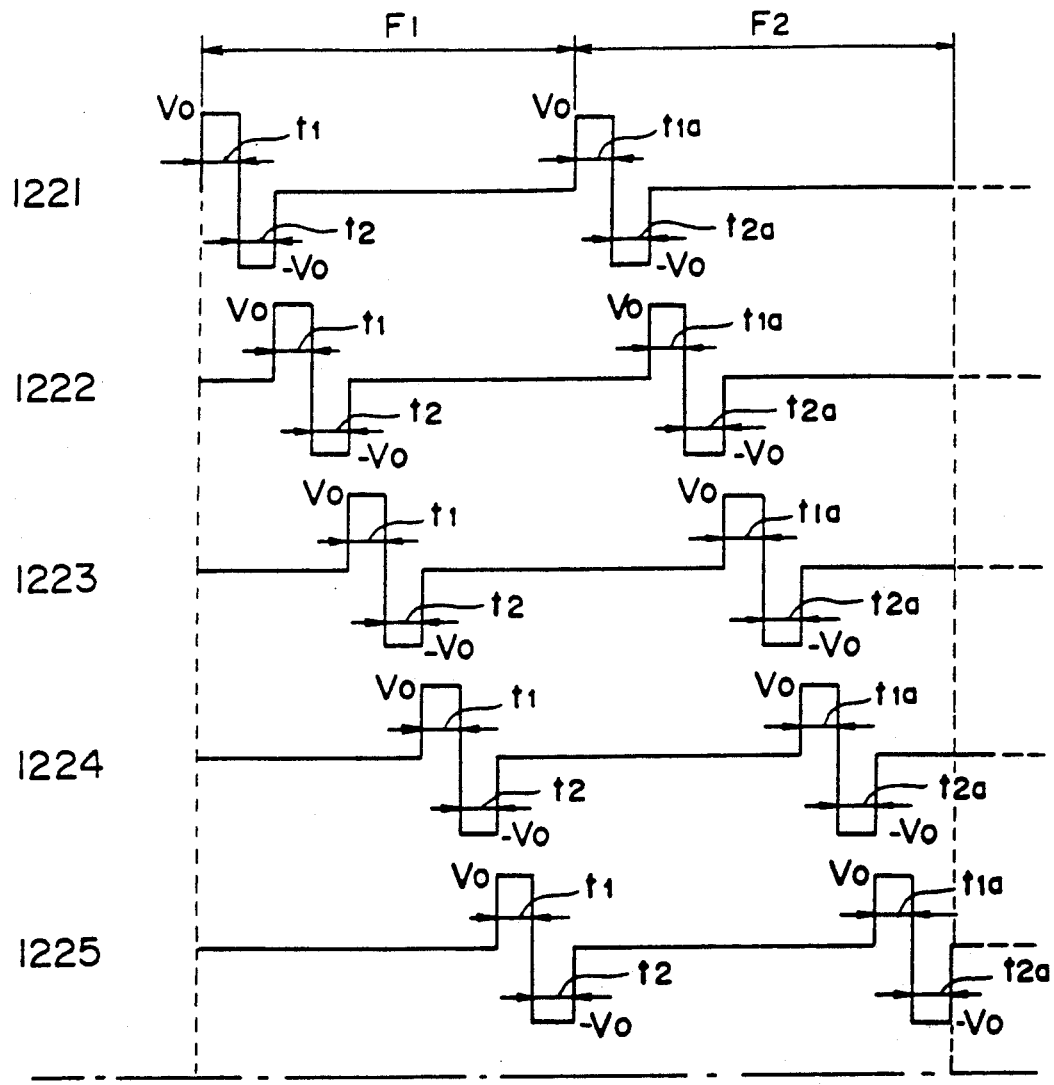
Figure 16B:
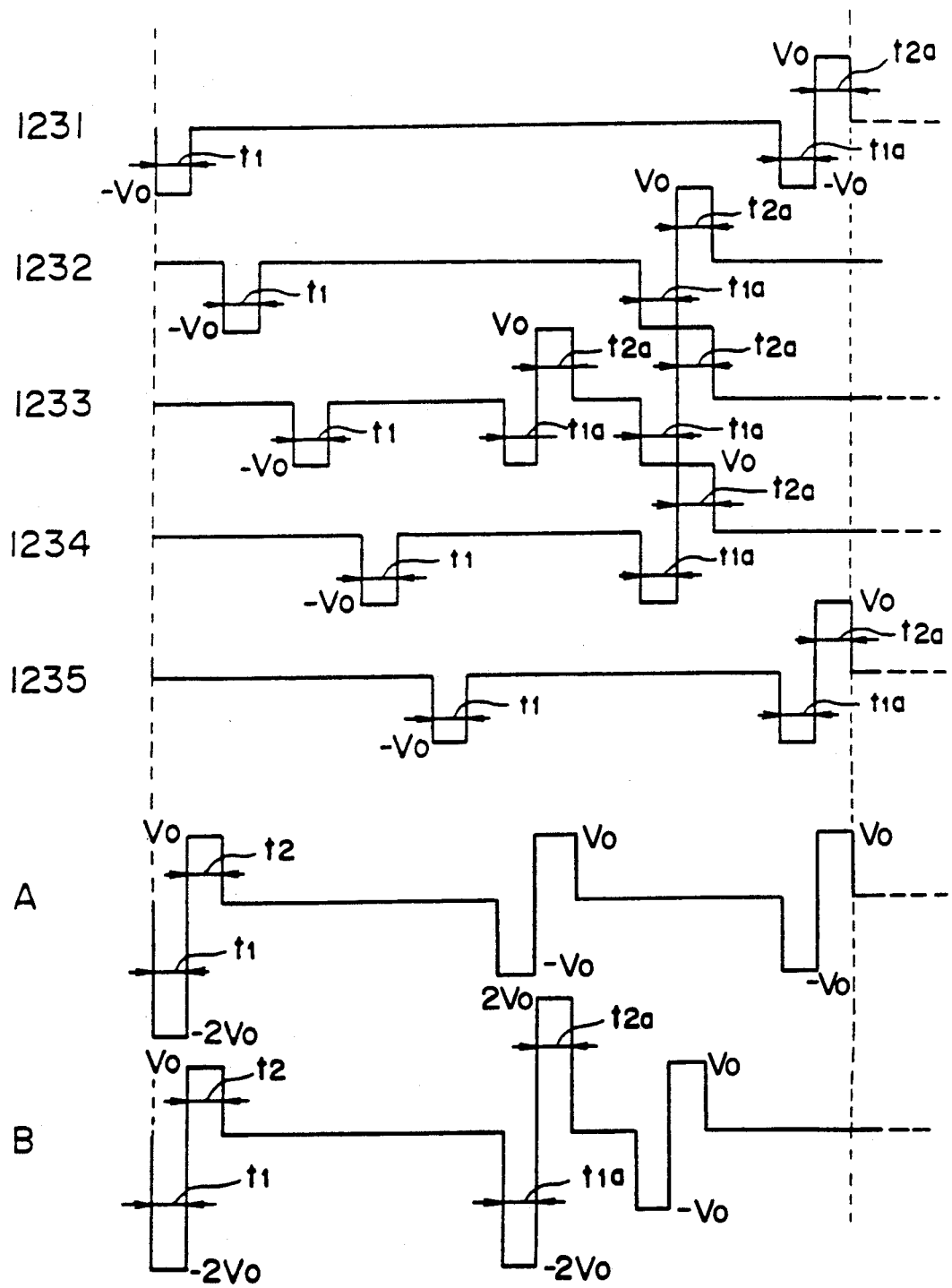
Figure 17:
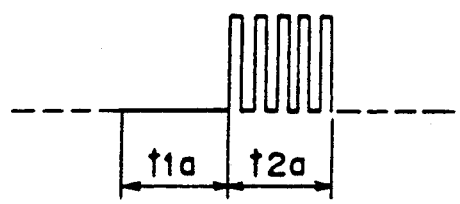
FIG. 17 shows the waveforms of voltages applied in yet a further embodiment of the present invention.
Figure 17:
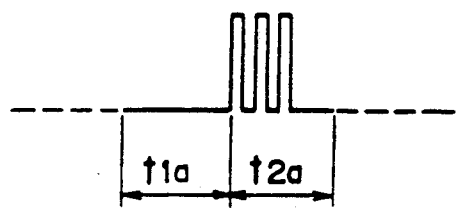
Figure 17:
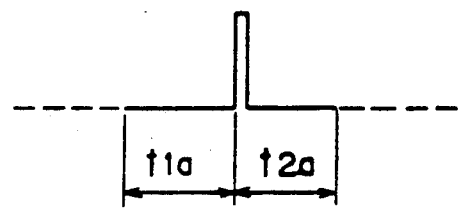
Figure 17:
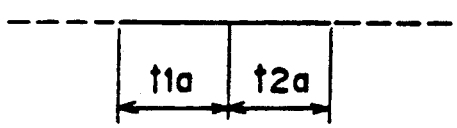

FIG. 15 shows a matrix of electrodes of a liquid crystal optical shutter which operates based upon the driving method in accordance with the present invention. The optical shutter has a plurality of picture elements 151 each with opposed transparent electrodes, a group of scanning electrodes 152 and a group of signal electrodes 153.

Figure 16:
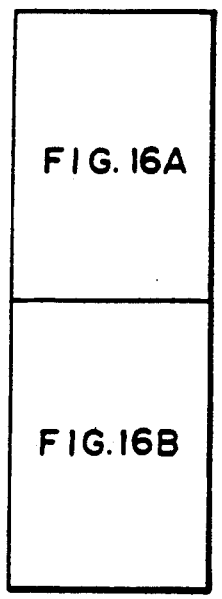
FIG. 16 (combination of FIGS. 16A and 16B) shows the waveforms of voltages applied in time series in a still further embodiment of the present invention.

FIG. 16 is a view used to explain a further embodiment of the driving method in accordance with the present invention. In this embodiment, a scanning signal is sequentially applied to the scanning electrodes 122 as shown in FIG. 12 and, in synchronism with the scanning signal, a "white" signal is applied to the signal electrodes 123, so that the whole picture once becomes "white" during a first frame $F_1$. In this case, $-2V_0$ is applied to each picture element during the phase $T_1$ and then $V_0$ which is lower than $Vth_1$ is applied during the phase $t_2$. Accordingly, the ferroelectric liquid crystal is driven into and maintained in the first stable state during the phase $t_1$ and $t_2$. Thereafter, a "black" signal is applied only to predetermined picture elements during a second frame $F_2$. The picture element (the black picture element shown in FIG. 12) to which the "black" signal is to be applied with $-2V_0$ during a phase $t_{1a}$ and then with $2V_0$ during a phase $t_{2a}$. As a result, the ferroelectric liquid crystal in the picture element is driven into the second stable state. The picture element B is applied with $-V_0$ and $V_0$, but $V_0$ satisfies the following relations as described before: $V_0 < V_{th1} < 2V_0$, and $-V_0 > Vth_2 > -2V_0$, so that the picture element B will not be reversed to "white".

So far, the liquid crystal of a picture element has been described as being uniform and the whole region of each picture element has been described as being driven into the first or second stable state. However, the orientation of a ferroelectric liquid crystal is influenced in an extremely delicate manner by the interaction between the liquid crystal and the surfaces of the base plates. Accordingly, when the difference between an applied voltage and a threshold voltage $Vth_1$ or $Vth_2$ is small, a picture element can be driven into a state in which some molecules of the liquid crystal of the picture element are driven into the first stable state while the remaining molecules into the second stable state. Therefore, it becomes possible by utilizing this phenomenon to apply a signal during the second phase of an information signal so that a gradation of a picture element can be produced. For instance, when the same scanning signals are applied as in the case of the driving method described with reference to FIG. 14 or 16, it becomes possible to display a picture with a gradation by varying the number of pulses of an information signal applied to the signal electrode during the phase $t_{2a}$ as shown in FIGS. 17(a)-(d).

Further, it is possible to utilize not only the variations in surface condition of the base plates which are the natural results of the treatment of the base plates but also the conditions of the surfaces with extremely fine mossic patterns of the base plates.

The driving method in accordance with the present invention can be applied in various fields such as liquid crystals optical shutters, liquid crystal television receivers, display devices and so on.

What is claimed is:

1. An optical modulation device of the type having a group of scanning electrodes, a group of signal electrodes and a chiral smectic liquid crystal having a first and a second stable state interposed between said group of scanning electrodes and said group of signal electrodes; said optical modulation device employing a driving method having a first step in which a scanning signal is sequentially applied to the whole or a part of the scanning electrodes, a signal is applied to the whole or a part of said signal electrodes so that a voltage of one polarity is applied to the related picture elements on each scanning electrode to orient the chiral smectic liquid crystal to assume the first stable state; and a second step in which a scanning signal is sequentially applied to the whole or a part of the scanning electrodes, a signal is applied to a selected signal electrode among the whole or a part of said signal electrodes so that, on each scanning electrode, a voltage of the other polarity is applied to a selected picture element to orient the chiral smectic liquid crystal to assume the second stable state at the selected picture element, and a voltage not exceeding a threshold voltage of the chiral smectic liquid crystal is applied to the other picture elements.

2. The optical modulation device according to claim 1, wherein the chiral smectic liquid crystal is in C, H, I, J, K, G or F phase.

3. The optical modulation device according to claim 1, wherein the chiral smectic liquid crystal is in C or H phase.

4. The optical modulation device according to claim 1, wherein the chiral smectic liquid crystal is disposed in a layer thin enough to release the helical structure of the chiral smectic liquid crystal.

5. An optical modulation device of the type in which a plurality of picture elements are arranged in the form of a matrix having a plurality of rows and a plurality of columns; scanning electrodes arranged in columns and signal electrodes arranged in rows is intersected so as to define each of said plurality of picture elements; a chiral smectic liquid crystal having a first and a second stable state is electrically connected to said plurality of picture elements; and the picture elements in each row are selectively shuttered when the chiral smectic liquid crystal is oriented to assume either one of the first and second stable states; said optical modulation device employing a driving method having a first step in which a scanning signal is sequentially applied to the whole or a part of the scanning electrodes while, in synchronism with the scanning signal, a signal is applied to the whole or a part of said signal electrodes so that a voltage of one polarity is applied to the related picture elements on each scanning electrode to orient the chiral smectic liquid crystal to assume the first stable state; and a second step in which a scanning signal is sequentially applied to the whole or a part of said scanning electrodes while, in synchronism with said scanning signal, a signal is applied to a selected signal electrode among the whole or a part of said signal electrodes so that, on each scanning electrode, a voltage of the other polarity is applied to a selected picture element to orient the chiral smectic liquid crystal to assume the second stable state at the selected picture element, and a voltage not exceeding a threshold voltage of the chiral smectic liquid crystal is applied to the other picture elements.

6. The optical modulation device according to claim 5, wherein the chiral smectic liquid crystal is in C, H, I, J, K, G or F phase.

7. The optical modulation device according to claim 5, wherein the chiral smectic liquid crystal is in C or H phase.

8. The optical modulation device according to claim 5, wherein the chiral smectic liquid crystal is disposed in a layer thin enough to release the helical structure of the chiral smectic liquid crystal.

* * * * *

UNITED STATES PATENT AND TRADEMARK OFFICE
CERTIFICATE OF CORRECTION

PATENT NO. : 5,093,737
DATED : March 3, 1992
INVENTOR(S) : JUNICHIRO KANBE, ET AL.            Page 1 of 2

It is certified that error appears in the above-indentified patent and that said Letters Patent is hereby corrected as shown below:

ON THE TITLE PAGE, AND COL. 1, LINE 3:

IN [54] TITLE

"THEFOR" should read --THEREFOR--.

IN [30] FOREIGN APPLICATION PRIORITY DATA

"Jul. 10, 1984  [JP]  Japan ......... 59-14381" should read
--Jul. 10, 1984  [JP]  Japan ......... 59-143481--.

IN [56] REFERENCES CITED

UNDER U.S. PATENT DOCUMENTS, "Iue et al." should read
--Irie et al.--.

COLUMN 1

Line 3, "THEFOR" should read --THEREFOR--.

COLUMN 7

Line 32, "$-2V_0 < -Vth_2 - V_0$" should read -- $-2V_0 < -Vth_2 < -V_0$ --.

COLUMN 10

Line 31, "$-V_0 > -Vth_2 > 2V_0$" should read -- $-V_0 > -Vth_2 > -2V_0$ --.

COLUMN 11

Line 17, "phase $T_1$" should read --phase $t_1$--.

UNITED STATES PATENT AND TRADEMARK OFFICE
CERTIFICATE OF CORRECTION

PATENT NO. : 5,093,737
DATED : March 3, 1992
INVENTOR(S) : JUNICHIRO KANBE, ET AL.     Page 2 of 2

It is certified that error appears in the above-indentified patent and that said Letters Patent is hereby corrected as shown below:

<u>COLUMN 12</u>

Line 32, "is intersected" should read --intersect--.

Signed and Sealed this

Fifteenth Day of November, 1994

Attest:

BRUCE LEHMAN

Attesting Officer    Commissioner of Patents and Trademarks